(No Model.)
W. H. KNIGHT.
ELECTRIC LOCOMOTIVE.
No. 432,142. Patented July 15, 1890.
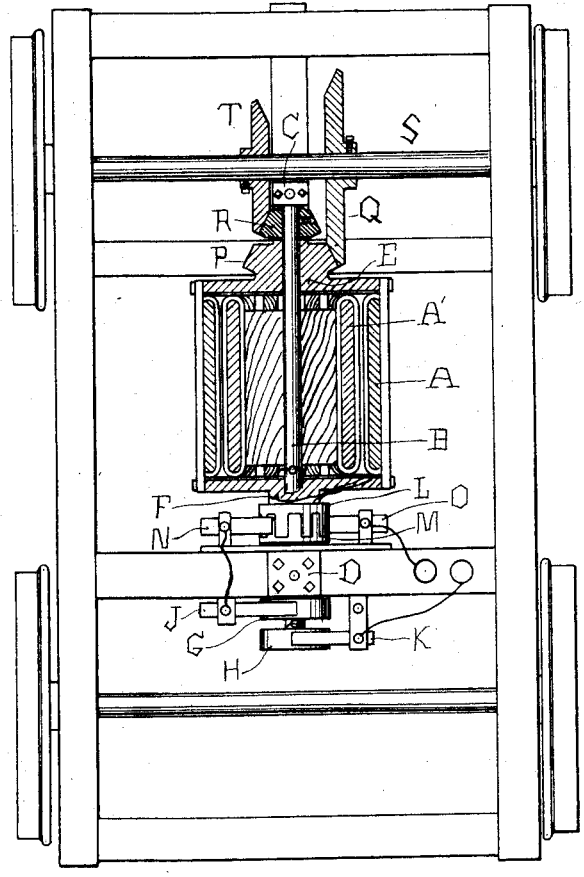
Witnesses
W. S. Lewis
Albert E. Lynch
Inventor
Walter H. Knight
by Bentley & Knight
Attys.

UNITED STATES PATENT OFFICE.

WALTER H. KNIGHT, OF NEW YORK, N. Y.

ELECTRIC LOCOMOTIVE.

SPECIFICATION forming part of Letters Patent No. 432,142, dated July 15, 1890.

Application filed February 24, 1885. Serial No. 156,649. (No model.)

*To all whom it may concern:*

Be it known that I, WALTER H. KNIGHT, a citizen of the United States, and a resident of New York city, New York, have invented certain new and useful Improvements in Electric Locomotives, of which the following is a specification, reference being made to the accompanying drawing, which is a plan view of my invention, showing parts in section.

My invention consists in combining with the driving-wheels of an electric locomotive a motor consisting of two oppositely-rotating parts which mutually react upon each other, and which are mechanically connected to the driving-wheels in such a manner as to give a coincident rotative tendency thereto. In electric locomotives it is well known that the best results are obtained when the propelling-motor rotates at a high rate of speed relatively to the axle of the locomotive, because the counter electro-motive force generated by the "dynamo" action of the motor is thus at its maximum. It therefore becomes necessary to connect the armature of the motor with the axle through intermediate speed-reducing mechanism, which is an objectionable feature of the locomotive.

In my invention the two parts (corresponding to field-magnet and armature) of the motor both rotate and in opposite directions, so that the counter electro-motive force will be double that of an ordinary motor running at the same armature speed, because the relative speed of the coils of the two parts upon which the counter electro-motive force depends is obviously double that of either one part. For this reason one-half of the speed-reducing mechanism may be dispensed with and the connection between armature and axle be much simplified.

In the accompanying drawing, A A′ represent two ring-armatures of any well-known type, such as the Pacinotti, Gramme, or Elias. These two rings are concentric and placed one within the other. The inner ring is fast on a shaft B, which has bearings at C and D in the frame of the locomotive. The bearings of the outer ring consist of two sleeves E and F, which turn on shaft B. The two rings in this case form an Elias motor, which is of such well-known construction as to need but a general description. The coils on the inner ring are so wound as to set up a number of consequent poles in the ring when the current passes through them. The terminals of the coils are led to two collars G and H on shaft B, on which bear the two brushes J and K, respectively. The current thus passes uninterruptedly and in a constant direction through the ring, and the poles maintain their position in the ring as it rotates. The other ring is wound in like manner; but the terminals are led to two collars L and M, which are formed with interlapping teeth, and on which the brushes N and O bear. The collars and brushes form a reversing commutator of well-known construction and act to change the direction of current and the resulting polarity of the outer ring whenever its poles come opposite the poles of the inner ring. In operation therefore the poles of the two rings will mutually attract each other when the current is sent through them, and both being free to rotate, they will continue to turn until their poles come together, when the polarity of one ring is reversed and the attraction becomes a repulsion tending to continue the rotation.

I do not intend to confine myself to the precise form of motor described, for the two rings may be placed side by side and may be of the Gramme or Brush type; or any other form of motor, wherein both parts rotate in the manner described, may be employed. Each of the revolving parts of the propelling-motor is connected to an axle of the locomotive through independent speed-reducing and power-transmitting mechanism in the following manner:

Connected with ring A is a beveled-friction or toothed gear-wheel P, engaging with a like beveled wheel Q on the axle S, while on shaft B is a wheel R engaging with wheel T on the axle. The ratio between the diameters of P and Q is exactly equal to that of R and T, and while P and R rotate in opposite directions they engage with the inner surfaces of Q and T and coact to give the same rotative tendency to shaft S and the driving-wheels on it. If friction-gears are used, a longitudinal pressure on shaft B will give sufficient adhesion without strain on the shaft, and any wear on the friction-wheels will be automatically taken up. The gear or friction wheels are, as shown, so arranged upon the axle S that their lines of pressure are transverse and diametrically opposite to the motor-shaft, so that the pressure thereupon will be balanced. This prevents wear upon the bearings and adds greatly to the ease of running of the motor.

I claim—

1. The combination, in an electric locomotive, of a propelling-motor consisting of two oppositely-rotating parts and independent speed-reducing and power-transmitting mechanism connecting each part to an axle of the locomotive, for the purpose set forth.

2. The combination, in an electric locomotive, of two oppositely-rotating friction-pinions on the motor-shaft and two friction-wheels connected to the axle of the locomotive, and having their line of pressure transverse to the motor-shaft at diametrically-opposite points so that the pressure on the said shaft will be balanced.

3. The combination of the two rotating electro-magnetic parts A and A', the shaft B, fixed to one of said parts and connected to the driving-wheel through intermediate speed-reducing mechanism, and sleeve E, fixed to the other of said parts and also connected to the driving-wheel.

WALTER H. KNIGHT.

Attest:
E. M. BENTLEY,
W. S. LEWIS.